US009892520B2

(12) United States Patent
Mansour et al.

(10) Patent No.: US 9,892,520 B2
(45) Date of Patent: *Feb. 13, 2018

(54) METHOD AND SYSTEM FOR SEGMENTING PEDESTRIAN FLOWS IN VIDEOS

(71) Applicant: Mitsubishi Electric Research Laboratories, Inc., Cambridge, MA (US)

(72) Inventors: Hassan Mansour, Boston, MA (US); Caglayan Dicle, Cambridge, MA (US); Dong Tian, Boxborough, MA (US); Mouhacine Benosman, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,570

(22) Filed: Jan. 31, 2017

(65) Prior Publication Data

US 2017/0140546 A1 May 18, 2017

Related U.S. Application Data

(63) Continuation of application No. 14/932,113, filed on Nov. 4, 2015, now Pat. No. 9,600,896.

(51) Int. Cl.
*G06K 9/34* (2006.01)
*G06T 7/215* (2017.01)
(Continued)

(52) U.S. Cl.
CPC .......... *G06T 7/215* (2017.01); *G06K 9/00778* (2013.01); *G06T 5/002* (2013.01);
(Continued)

(58) Field of Classification Search
CPC ....... G06T 7/0071; G06T 7/0097; G06T 7/20; G06T 7/2006; G06T 7/2073;
(Continued)

(56) References Cited

U.S. PATENT DOCUMENTS 8,213,679 B2 * 7/2012 Yao .................... G06K 9/00785
348/169
8,358,806 B2 1/2013 Dong et al.
(Continued)

FOREIGN PATENT DOCUMENTS

WO   WO 2005114555 A1 * 12/2005 ......... G06K 9/00778
WO   WO 2013081750 A1 *  6/2013 ......... G06K 9/00771

OTHER PUBLICATIONS

Lu Xiawei et al. "Flux based pedestrian flow estimation in occluded scenes", 2014 IEEE International Symposium on Broadband Multimedia Systems and Broadcasting, IEEE. Jun. 25, 2014, pp. 1-5.
(Continued)

*Primary Examiner* — Jose Couso
(74) *Attorney, Agent, or Firm* — Gene Vinokur; James McAleenan; Hironori Tsukamoto

(57) ABSTRACT

A method and system determines flows by first acquiring a video of the flows with a camera, wherein the flows are pedestrians in a scene, wherein the video includes a set of frames. Motion vectors are extracted from each frame in the set, and a data matrix is constructed from the motion vectors in the set of frames. A low rank Koopman operator is determined from the data matrix and a spectrum of the low rank Koopman operator is analyzed to determine a set of Koopman modes. Then, the frames are segmented into independent flows according to a clustering of the Koopman modes.

20 Claims, 4 Drawing Sheets

(51) Int. Cl.
  *G06T 7/246* (2017.01)
  *G06K 9/00* (2006.01)
  *G06T 5/00* (2006.01)
  *G06T 7/174* (2017.01)
  *G06T 7/136* (2017.01)

(52) U.S. Cl.
  CPC .............. *G06T 7/136* (2017.01); *G06T 7/174* (2017.01); *G06T 7/246* (2017.01); *G06T 2207/10016* (2013.01); *G06T 2207/30196* (2013.01); *G06T 2207/30232* (2013.01)

(58) Field of Classification Search
  CPC ........ G06T 7/2083; G06T 2207/10016; G06K 9/00335; G06K 9/00369; G06K 9/00771; G06K 9/00718; G06K 9/00765; G06K 9/00778; G06K 9/52; H04N 5/144–5/145; H04N 5/23251; H04N 7/0137; H04N 7/014; H04N 7/0157; H04N 7/18; H04N 13/0264; H04N 13/0468; H04N 2013/0085; H04N 19/137; H04N 19/139; H04N 19/426; H04N 19/48; H04N 19/543; H04N 21/44218
  See application file for complete search history.

(56) References Cited

U.S. PATENT DOCUMENTS

| | | | | |
|---|---|---|---|---|
| 8,451,384 B2 * | 5/2013 | Gaddy | ..................... | H04N 5/14 348/699 |
| 8,744,124 B2 * | 6/2014 | Venkatesh | .......... | G06K 9/00771 382/103 |
| 8,773,536 B1 | 7/2014 | Zhang | | |
| 9,256,955 B2 * | 2/2016 | O'Gorman | ......... | G06K 9/00718 |
| 9,600,896 B1 * | 3/2017 | Mansour | ............ | G06K 9/00765 |
| 9,674,406 B2 * | 6/2017 | Kutz | .................... | H04N 5/2226 |

OTHER PUBLICATIONS

Dicle et al. "Robust low rank dynamic mode decomposition for compressed domain crowd traffic flow analysis", 2016 IEEE International Conference on Multimedia and Expo, IEEE. Jul. 11, 2016, pp. 1-6.

Kutz et al. "Multi-Resolution Dynamic Mode Decomposition", Jun. 1, 2015. https://arxiv.org/pdf/1506.00564.pdf.

Erichson et al. "Randomized low-rank Dynamic Mode Decomposition for motion detection", Computer Vision and Image Understanding, Academic Press, US. vol. 146, Feb. 12, 2016. pp. 40-50.

Jovanovi et al. "Low Rank and Sparse Dynamic Mode Decomposition," Dec. 31, 2012. https://web.stanford.edu/group/ctr/ResBriefs/2012/12_jovanovic.pdf.

Ozer et al. "A Hierarchical Human Detection System in (Un)Compressed Domains", IEEE Transactions on Multimedia, IEEE Service Center, Piscataway, NJ, US. vol. 4, No. 2, Jun. 1, 2002.

* cited by examiner

METHOD AND SYSTEM FOR SEGMENTING PEDESTRIAN FLOWS IN VIDEOS

FIELD OF THE INVENTION

This invention relates generally to computer vision, an more particularly segmenting pedestrians in flows as depicted in videos.

BACKGROUND OF THE INVENTION

The segmentation of motion flows within dense crowds of pedestrians in videos is an essential tool in crowd safety and crowd control applications. Videos of crowded scenes can exhibit complex crowd behaviors even under normal situations. For example, crowd flows in large congested areas, such as train stations, can initially appear chaotic. However, is often the case that low dimensional dynamical structures exist in the flow that is desirable to identify and segment from unstructured flows. Moreover, the automatic segmentation of independent crowd flows aids in the monitoring and prediction of hazardous situations in crowded environments.

Of particular interest is the detection and estimation of crowd flows using motion information extracted from the videos. Motion vectors can be determined using optical flow estimation applied to texture, that is pixel intensities, in videos, or the motion vectors can be extracted directly from a bitstream. The bitstream can encoded using any of the well known coding standards, e.g., MPEG, H.264, HEVC, etc.

Considering pedestrians in a crowded scene as particles in a flow, the motion vectors of a video frame correspond to observations of the velocities of particles at a time instance in the flow. Processing motion vectors, instead of the video texture, protects the privacy of individuals observed in surveillance videos.

U.S. Pat. No. 8,773,536 discloses a method for detecting independent motion in a surveillance video. The method constructs a linear system from macroblocks of the video by comparing texture gradients with motion vector. Independent flows are detected when the motion is flagged as a statistical outlier relative to the linear system.

U.S. Pat. No. 8,358,806 discloses a method for crowd segmentation in a video using shape indexing. Background differencing is performed on the video to identify a foreground silhouette shape. Approximate numbers and positions of people are determined by matching the foreground silhouette shape against a set of predetermined foreground silhouette shapes.

Dynamical System Modeling

When the density of a crowd of pedestrians is high, the motion of individuals in the crowd can be modeled as a fluid flow. One such model that is commonly used for crowd analysis is the Hughes model, see: Hughes, "A continuum theory for the flow of pedestrians," Transportation Research Part B: Methodological, Volume 36, Issue 6, Pages 507-535, July 2002.

Hughes models a crowd flow as a function of density $\rho(x, y, t)$, and velocities ($u(x, y, t)$ and $v(x, y, t)$) as $$\frac{\partial}{\partial t}\rho(x, y, t) + \frac{\partial}{\partial x}(\rho(x, y, t)u(x, y, t)) + \frac{\partial}{\partial y}(\rho(x, y, t)v(x, y, t)) = 0, \quad (1)$$

where $u(x, y, t)$ and $v(x, y, t)$ are the respective velocities in the horizontal and vertical directions of every spatial point $(x, y)$ and time $t$. A Greenshields model can also be used to relate the density and velocity fields in crowd modeling. The Greenshields model is $$u(x, y, t) = \bar{u}\left(1 - \frac{\rho(x, y, t)}{\bar{\rho}}\right), \quad (2)$$

$$v(x, y, t) = \bar{v}\left(1 - \frac{\rho(x, y, t)}{\bar{\rho}}\right),$$

where $\bar{u}$ and $\bar{v}$ are system parameters determining maximal velocities in the horizontal and vertical directions, and $\bar{\rho}$ is a maximal density in the scene.

The solution to (1) results in a crowd density map $\rho$, and the velocity fields $(u, v)$ for all $(x, y, t)$ that satisfy given initial and boundary conditions. Although the dimensionality of the differential equations governing the evolution of $\rho$ and $(u, v)$ can be infinite, it is often the case that the flows exhibit low dimensional behavior.

A low dimensional state variable at time $t$ is $x(t)$, for which an observable vector $y(t)=G(x(t))$ corresponds to stacking of the density and velocity fields for all positions $x$ and $y$ at time $t$. The function $G$ is a mapping from the low dimensional manifold on which $x$ evolves to a space of observables. Then, the solution to (1) determines the transient response and stability of the corresponding dynamical system generally characterized by $$\dot{x}(t) = F(x(t)), \quad (3)$$

where $F(\bullet)$ is some mapping in the low dimensional manifold on which the dynamical system evolves. For discrete time systems, the dynamical system evolution is characterized by $$x_{k+1} = F(x_k), \quad (4)$$

where $k$ is a time index.

The Koopman Operator and Dynamic Mode Decomposition

The Koopman operator is a linear operator $K$ that satisfies $$G(F(x_k)) = KG(x_k)$$

$$\Leftrightarrow y_{k+1} = Ky_k. \quad (5)$$

Although this dynamical system is nonlinear and evolves a finite dimensional manifold, the Koopman operator is linear and infinitly dimensional. Spectral analysis of the Koopman operator can be used to decompose the flow in terms of Koopman modes and associated Koopman eigenvalues that determine the temporal behavior of the corresponding Koopman mode.

A dynamic mode decomposition (DMD) can be used to estimate the Koopman modes. The DMD has been used in fluid dynamics as a data-driven and equation-free method for identifying system dynamics. Consider data matrices $$Y_1 = \begin{bmatrix} | & | & & | \\ y_0 & y_1 & \cdots & y_{m-1} \\ | & | & & | \end{bmatrix}; Y_2 = \begin{bmatrix} | & | & & | \\ y_1 & y_2 & \cdots & y_m \\ | & | & & | \end{bmatrix}. \quad (6)$$

The DMD determine the best fit matrix $K$ that satisfies the relation $$Y_2 \approx KY_1. \quad (7)$$

The eigenvectors and eigenvalues of K approximate the Koopman modes and Koopman eigenvalues. Herein, the terms Koopman modes and DMD modes are used interchangeably.

SUMMARY OF THE INVENTION

The embodiments of the invention provide a method and system for segmenting pedestrian flows in a scene based on motion vectors in an video acquired of a scene by a video camera. The motion vectors are treated as observables of an underlying dynamical system that defines the flows in the scene as organized in an input data matrix. The method determines a low rank Koopman operator that characterizes the dynamical system using the motion vectors. Then, the spectrum of the Koopman operator is analyzed to segment independent flows in the scene.

In one embodiment of the invention, a low rank Koopman operator is determined by solving a nuclear norm minimization problem constrained by a one step prediction equation of a dynamic mode decomposition (DMD). The effect of noise can be minimized by selecting an appropriate regularizer for the distribution of the noise. For example, a Frobenius norm or Euclidean norm regularizer can be used for Gaussian distributed noise. A sum of absolute values or one-norm regularizer can be used for sparse impulsive noise. In the case both types of noise exist, two regularizers can be used during the optimization.

One embodiment of the invention performs a singular value decomposition (SVD) of the Koopman operator. Row space (left) singular vectors corresponding to the nonzero singular values are then used to cluster blocks in the video as segments corresponding to independent flows. In another embodiment, the eigenvectors of the Koopman operator are determined, and the input data matrix is projected onto the eigenvectors. The eigenvectors that have magnitude projection coefficients greater than a threshold are then used to cluster blocks and segment the independent flows.

Another embodiment of the invention characterizes the segmented pedestrian flows by identifying a dynamical regime according to eigenvalues of the eigenvectors that describe the dynamics for each flow. The segmented flow data are projected onto the eigenvectors of the Koopman operator and the eigenvalues that are associated with the eigenvectors that have magnitude projection coefficients greater than a threshold are t used to define the dynamical regime. The dynamical regime characterizes the type of the flow as, for example, stable or unstable.

DETAILED DESCRIPTION OF THE PREFERRED EMBODIMENTS

Figure 1:
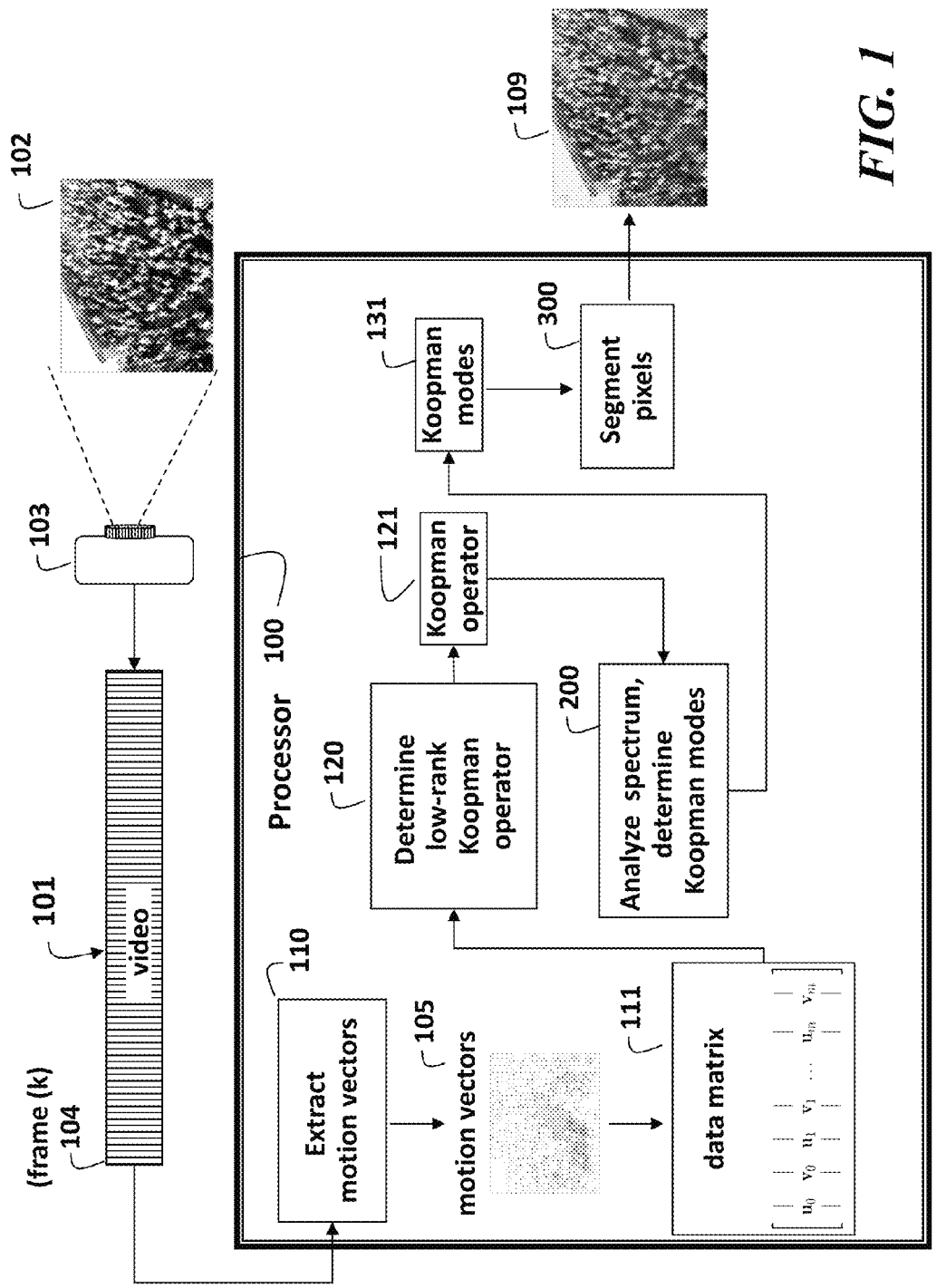
FIG. 1 is a schematic of a system and method for segmenting pedestrians flows in a video acquired of a scene according to the embodiments of the invention.

As shown in FIG. 1, the embodiments of our invention provide a system and method for segmenting pedestrians flows in a video acquired of a scene. The embodiments can use motion vectors extracted from an encoded bitstream, although the motion vectors can be obtained by other means. The motion vectors are treated as observables of an underlying dynamical system composed of several independent dynamics that characterize the flows in the scene. The method determines a low rank Koopman operator that characterizes the dynamical system using the motion vectors. The spectrum of the Koopman operator is then analyzed using singular value decomposition (SVD) or eigenvalue decomposition. The independent crowd flows are determined by clustering the dominant singular vectors or the dominant eigenvectors, depending on the decomposition that is used.

System and Method Overview

As shown in FIG. 1, a video 101 is acquired of pedestrians in a scene 102 with a video camera 103. The video includes a set of frames. Each frame includes a set of blocks that typically encode motion vectors. Each frame k 104 is processed by the method operating in a processor 100 connected to memory and the camera by input/output buses as known in the art. The video is in a form of an encoded bitstream.

As an advantage, an encoded bitstream is usually compressed by at least two orders of magnitude or more. Hence, the bitstream takes much less storage and time to process. In addition, the method can operate at the block level so that the bitstream does not need to be decode to obtain pixels. However, the method can operate in a camera and obtain the motion vectors by other means.

The method extracts 110 motion vectors 105 from the video, e.g., blocks in the bitstream, and constructs a data matrix 111 by stacking the motion vectors as described below in greater detail.

A low-rank Koopman operator 121 is determined 120 from the data matrix 111. The spectrum of a low-rank Koopman operator is analyzed to determine dominant Koopman modes 131. The Koopman modes can than be used to segment 300 blocks in frames of the video to obtain independent flows 109.

Figure 2:
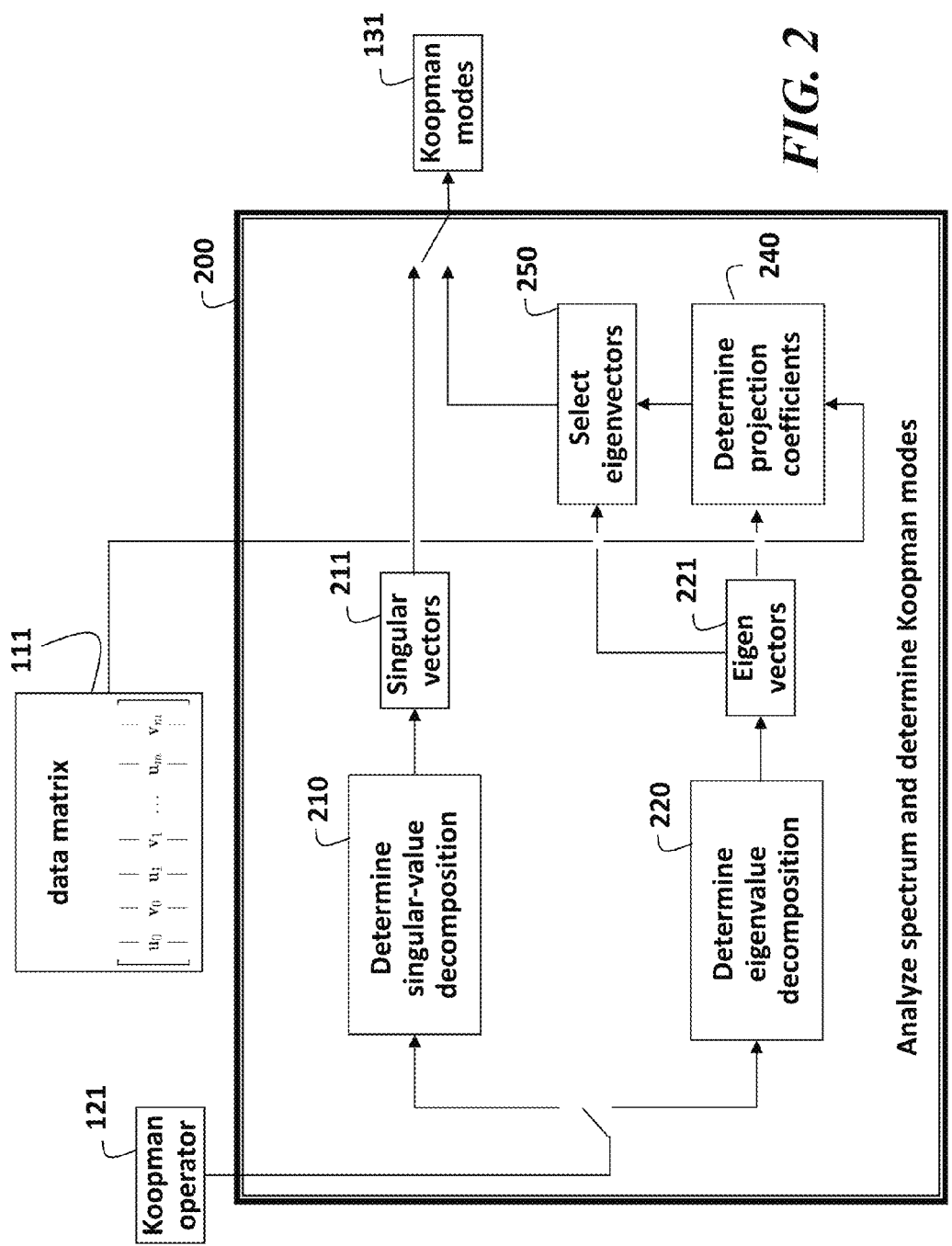
FIG. 2 is a flow diagram of a method for determining Koopman modes according to embodiments of the invention.

FIG. 2 shows the steps 200 used to analyze the spectrum and determine the Koopman modes 131. The steps include the SVD 210 to obtain singular vectors 211 or an eigenvalue decomposition to determine eigenvectors, or both. Step 240 determines projection coefficients, which are then use to select 250 eigenvectors. The singular vectors or selected eigenvectors, or both, can then be used to determine the Koopman modes 131.

Figure 3:
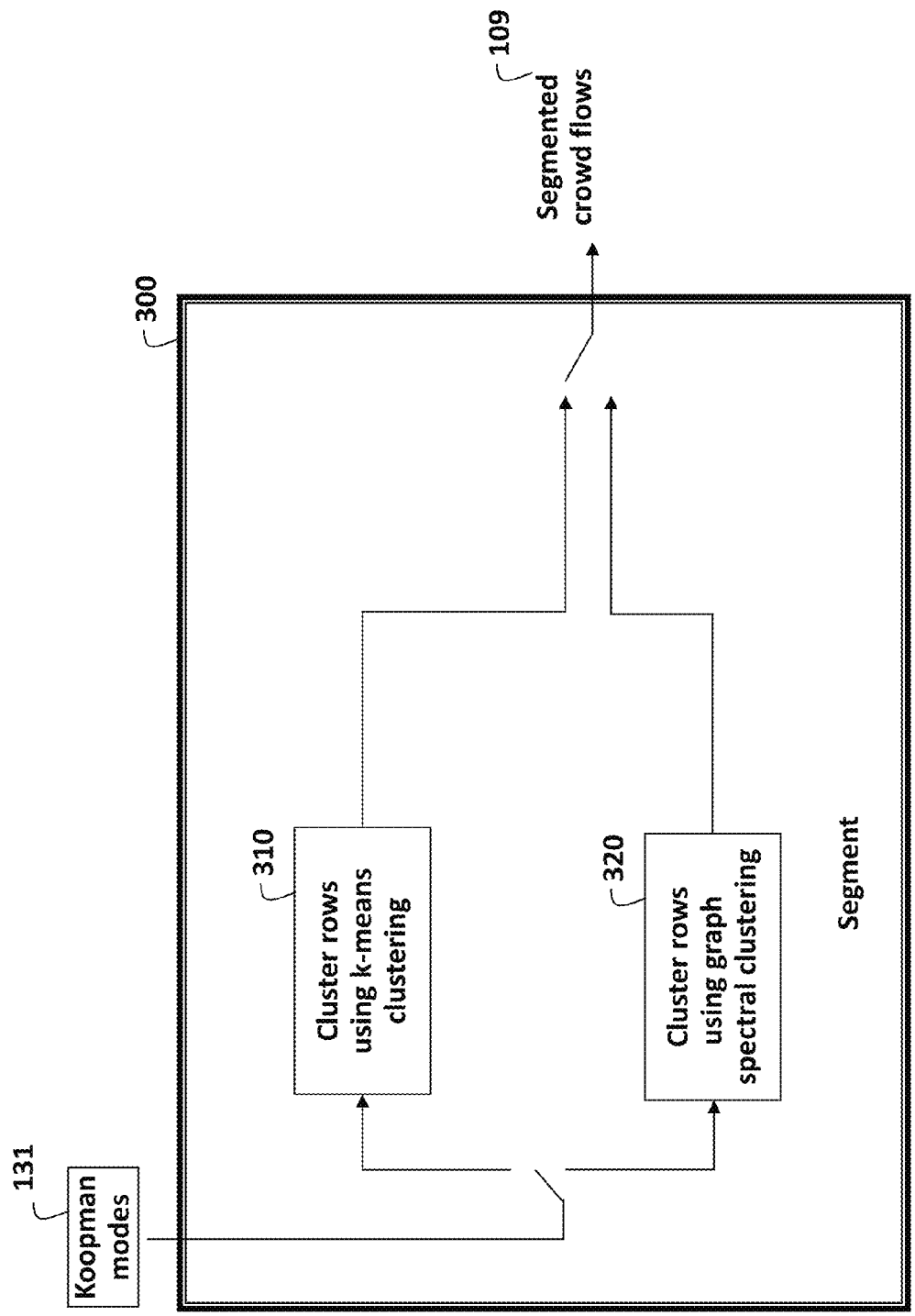
FIG. 3 is a flow diagram of a method for segmenting independent flows using the Koopman modes according to embodiments of the invention.

FIG. 3 shows the steps 200 of segmenting the pixels, which takes as input the Koopman modes 131. Motion vectors are clustered using k-means clustering 310 or graph spectral clustering 320 to obtain the independent flows 109.

Figure 4:
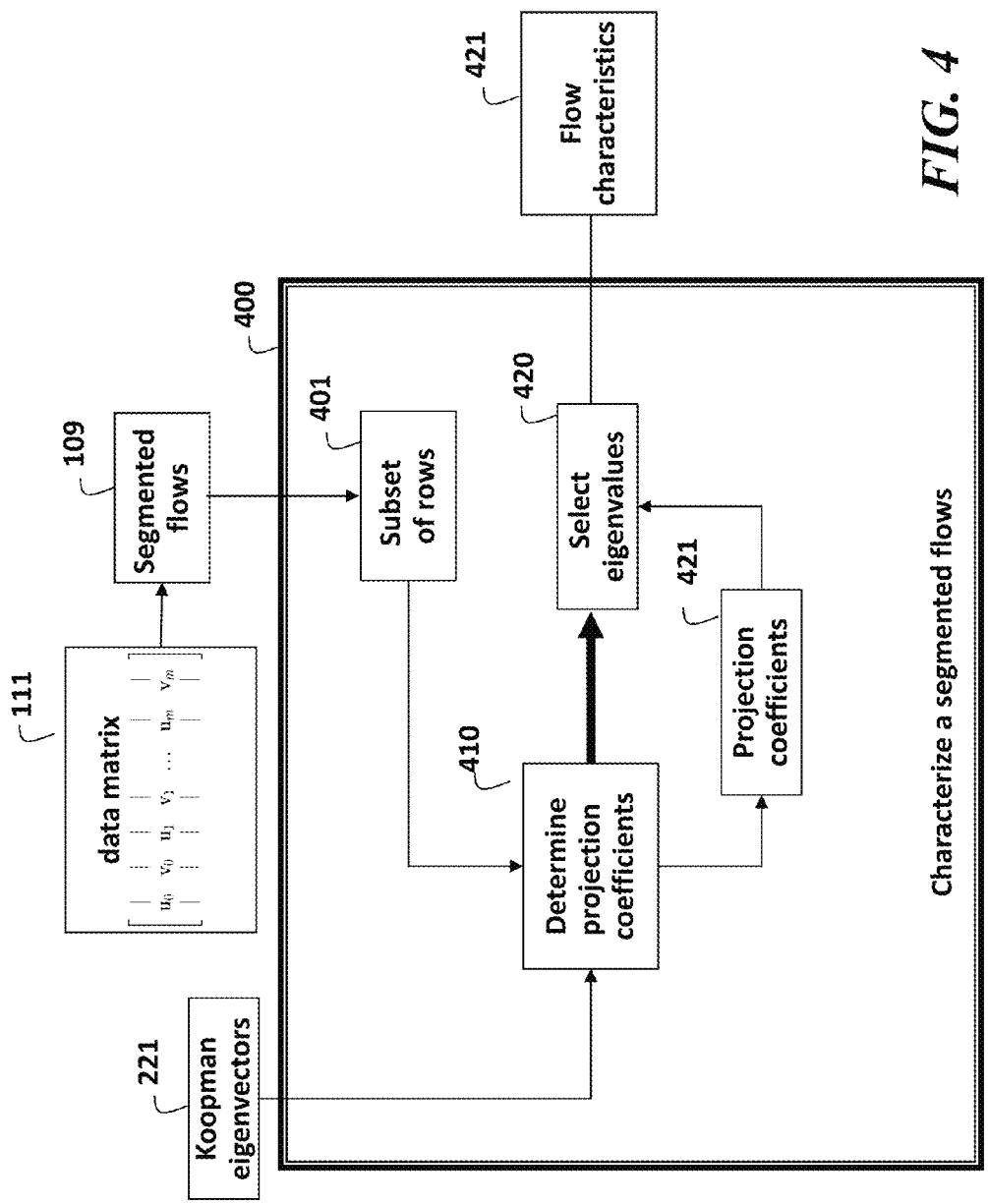
FIG. 4 is a flow diagram of a method for characterizing independent segmented pedestrian flows.

FIG. 4 shows the steps 400 of characterizing each segmented flow by determining a dynamical regime of the flow. The dynamical regimes essentially characterizes the flows. The steps take as input the Koopman eigenvectors 221, the data matrix 111 and the segmented flows 109. A subset of rows 401 of the data matrix 111 are extracted using the segmented flows 109. The subset of rows 401 are projected 410 onto the Koopman eigenvectors 221 to determine projection coefficients 411. An eigenvalue selection step 420 chooses the eigenvalues that correspond to the eigenvectors that have projection coefficients with magnitudes larger than a threshold. The dynamical regime of the flow or flow characteristics 421 is identified by the selected eigenvalues.

We now describe the details of the above steps.

Motion Vectors and Observable Data Matrix

The horizontal and vertical motion vectors of all spatial blocks in a video frame k 104 are $u_k$ and $v_k$, respectively. We construct the data matrix $z_k=[u_k, v_k]$ 111 by stacking the horizontal and vertical motion vectors in the data matrix 111. Then, the temporal evolution of the motion vectors can be modeled, using the Koopman operator K, by fitting the data to a one step prediction model $$z_k = K z_{k-1}. \qquad (8)$$

Notice that (8) ensures that the same operator K models the temporal evolution of the motions vectors $u_k$ and $v_k$.

If we have m+1 observations of motion vectors from m+1 video frames, then we can determine the operator K using a dynamic mode decomposition (DMD) by forming the data matrices $Z_1$ and $Z_2$ similar to (6) and determining the operator $K_{ls}$ that achieves the least squares fit, i.e., $$K_{ls} = \arg\min_K \frac{1}{2} \|Z_2 - KZ_1\|_F^2, \qquad (9)$$
$$= Z_2 Z_1^\dagger,$$

where the superscript † indicates the Moore-Penrose pseudo-inverse of a matrix.

If the motion vectors correspond to the true motion of pedestrians in the video, then the operator $K_{ls}$ characterizes the full dynamics of the flow in the system. However, compressed domain motion vectors are generally very noisy and often contain motion vectors that do not correspond to the true motion. The noise depends on the specific rate-distortion optimization by the video encoder.

Low-Rank DMD

A noise-free velocity observations $y_k$ measure true motion of pedestrians in the scene. and the motion vectors $z_k$ correspond to noisy observations, such that $$z_k + e_k = y_k, \qquad (10)$$

where $e_k$ is additive noise. Let $E_1$, E2 and $Y_1, Y_2$ be as in (6) for $e_k$ and $y_k$, respectively. Then, the Koopman operator corresponding to the noise-free dynamics is given by a total least squares constraint $$Y_2 = KY_1$$
$$\Leftrightarrow Z_2 + E2 = K(Z_1 + E_1). \qquad (11)$$

However, the problem (11) is non-convex and ill posed because only $Z_1$ and $Z_2$ are observed, and K, $E_1$ and $E_2$ are unknowns. To remedy this situation, we invoke the following prior conditions in our problem. Highly complex systems can be accurately modeled by low-order dynamics. This translates to the prior condition that the operator K modeling the evolution of a noise-free system has a low rank.

The second prior condition derives from the definition of the matrices $E_1$ and $E_2$. If we denote by $I_{m-1}$ the identity matrix of size (m−1)×(m−1), and let $\mathbb{I}^0 = [0 | I_{m-1}]^T$ and $\mathbb{I}_0 = [I_{m-1} | 0]^T$ be selection operators that respectively remove the first column and the last column of a matrix with m columns, then $E_1$ and $E_2$ satisfy a relation $$E_1 \mathbb{I}^0 = E_2 \mathbb{I}_0. \qquad (12)$$

We define the low-rank DMD with total least squares constraints (LR-DMDtls) as $$\min_{K, E_1, E_2} \|K\|_* + \frac{\gamma}{2}(\|E_2\|_F^2 + \|e_0\|_2^2), \qquad (13)$$

subject to $Z_2 + E2 = K(Z_1 + E_1)$, and $$E_1 \mathbb{I}^0 = E_2 \mathbb{I}_0,$$

where $e_0$ is the first column in $E_1$, $\gamma$ is a regularization parameter, and $\|K\|_*$ is the nuclear norm equal to the sum of the singular values of a matrix K.

If the number of motion blocks in a video frame is N, then the size of the operator K is N×N, which can become difficult to store and determine for high resolution videos. Therefore, we replace K with rank r factors $L \in \mathbb{R}^{N \times r}$ and $R \in \mathbb{R}^{N \times r}$, such that $K = LR^T$, to reduce the computational complexity. We use a nuclear norm proxy that replaces the nuclear norm of a matrix with an average of the square of the Frobenius norms of its low rank factors $$\|K\|_* = \inf_{L,R: K=LR^T} \frac{1}{2}(\|L\|_F^2 + \|R\|_F^2). \qquad (14)$$

Consequently, the low-rank DMD can be formulated as $$\min_{L,R,E_1,E_2} \frac{1}{2}(\|L\|_F^2 + \|R\|_F^2) + \frac{\gamma}{2}(\|E_2\|_F^2 + \|e_0\|_2^2), \qquad (15)$$

subject to $Z_2 + E_2 = L R^T (Z_1 + E_1)$, and $$E_1 \mathbb{I}^0 = E_2 \mathbb{I}_0,$$

which we solve using an alternating direction method of multiplier (ADMM).

The problem defined in (15) addresses the case where the noise is Gaussian distributed. If the measurements Z include outlier sparse noise, then we use the following formulation to solve the problem $$\min_{L,R,E_1,E_2,S_1,S_2} \frac{1}{2}(\|L\|_F^2 + \|R\|_F^2) + \frac{\gamma}{2}(\|E_2\|_F^2 + \|e_0\|_2^2) + \lambda \|S_2\|_1, \qquad (16)$$

subject to $Z_2 + E_2 + S_2 = L R^T (Z_1 + E_1 + S_1)$, $$E_1 \mathbb{I}^0 = E_2 \mathbb{I}_0,$$
$$S_1 \mathbb{I}^0 = S_2 \mathbb{I}_0,$$

where the variables $S_1$ and $S_2$ represent the outlier noise in the data, and $\gamma$ and $\lambda$ are regularization parameters. The solution to (16) can also be obtained using the ADMM procedure.

Flow Segmentation

In order to segment 300 different flows having independent dynamics, we evaluate the spectrum of the estimated low-rank Koopman operator $K = LR^T$. Here, we consider different scenarios for performing the segmentation.

Segmentation by Singular Value Decomposition

In a first approach, we can perform The SVD 210 of the Koopman operator K to extract row space singular vectors $U_r$ 211, such that $K=U_r \Sigma_r V_r^T$. The matrix $U_r$ is an N×r matrix, where r is the rank of the operator K. We treat the rows of $U_r$ as feature vectors for every pixel in the video frame to which we apply k-means clustering 310, as shown in FIG. 3, to segment the pixels into a predetermined number of clusters n. Then, the clustered pixels can be used to determine the spatial segmentation of independent flows 109 in the scene 102 as observed in the video 101.

Alternatively, we can apply spectral clustering to the rows of the matrix $U_r$. Here, we normalize the rows of $U_r$ to produce a matrix $\overline{U}_r$ and construct an affinity matrix $A=|\overline{U}_r \overline{U}_r^T|^2$, where the exponent is applied element-wise in this case. We then apply the following steps to determine the principal eigenvectors of the corresponding graph Laplacian.

$$A = A - \text{diag}(A)$$

$$D = \text{diag}(A \cdot 1)$$

$$L_G = D^{-1/2} A D^{-1/2}, \quad (17)$$

where 1 is the all one vector, the first diag(·) extracts only the diagonal entries of A, and the second diag(A·1) sums the rows of A and places the result on the diagonal of a matrix.

Next, we determine the SVD of $L_G$ to extract the first n row space singular vectors $U_G$. The first singular vector of $U_G$ is all ones so we remove this vector and then normalize the rows of the remaining vectors in $U_G$.

Finally, we apply k-means clustering 310 to the rows of $U_G$ to determine the independent flows 109. While the spectral clustering approach delivers better results than applying k-means clustering directly to the rows of $U_r$, it requires more large to construct a large N×N affinity matrix.

Segmentation by Eigenvalue Decomposition

In a second approach, we determine an eigenvalue decomposition 220 of K to obtain the eigenvectors $U_e$ 221, and eigenvalues $\Lambda_e$, such that $K=U_e \Lambda_e U_e^\dagger$. Recall, the eigenvectors of K estimate the Koopman modes of the dynamical system. From the data matrix $Z_2$, we identify the active modes by projecting $Z_2$ onto $U_e$ and averaging magnitudes of the projection coefficients in a vector $$\alpha = \frac{1}{m} |U_e^\dagger Z_2| \cdot 1.$$

The active modes are the columns of $U_e$ that correspond to the entries in $\alpha$ with a magnitude greater than a threshold. The matrix containing the active modes is $U_\alpha$. We perform the segmentation by applying k-means clustering to the normalized rows of $U_\alpha$. The pixels identifying with each cluster correspond to an independent flow in the video.

Flow Characterization

Each segmented flow can be characterized according to a dynamical regime, such that, the type of the flow is labeled as, for example, stable or unstable. The dynamical regime depends on locations of the eigenvalues of K that contribute most to the motion in that flow. To determine the eigenvalues, a subset of rows $Z_f$ of the data matrix associated with a segmented flow f are projected onto the eigenvectors $U_e$ to determine projection coefficients $$\alpha_f = \frac{1}{m} |U_e^\dagger Z_f| \cdot 1.$$

The eigenvalues corresponding to the entries in $\alpha_f$, with magnitudes larger than a threshold, are associated with the flow.

The locations of the eigenvalues in the complex plane are used to determine the regime of the flow. For example, stable flows have eigenvalues located on a unit circle, while unstable flows have eigenvalues located outside the unit circle. Moreover, transient flows that gradually decay have eigenvalues located inside the unit circle. Also, the complex phase of the eigenvalues indicate oscillating frequencies of the motion in a flow.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining flows, comprising the steps of:
    acquiring a video of the flows with a camera, wherein the flows are pedestrians in a scene, wherein the video includes a set of frames;
    extracting motion vectors from each frame in the set of frames;
    constructing a data matrix from the motion vectors in the set of frames;
    determining a low rank dynamical prediction operator from the data matrix;
    analyzing a spectrum of the low rank dynamical prediction operator to determine a set of dynamic modes; and
    segmenting the frames into the flows according to a clustering of the dynamic modes, wherein the flows are independent pedestrian flows, and wherein the steps are performed in a processor.

2. The method of claim 1, wherein the motion vectors include Gaussian distributed noise, and further comprising:
    determining the low rank dynamical prediction operator by solving a factorized nuclear norm minimization problem with least squares constraints or total least squares constraints; and
    minimizing the Gaussian distributed noise by a Frobenius norm regulizer.

3. The method of claim 1, wherein the motion vectors contain sparse outlier noise, and further comprising:
    minimizing the sparse outlier noise by a one-norm regulizer.

4. The method of claim 1, further comprising:
    performing a singular value decomposition (SVD) of the low rank dynamical prediction operator to produce singular vectors; and
    applying a k-means clustering or a graph spectral clustering to row space singular vectors of the low rank dynamical prediction operator.

5. The method of claim 1, further comprising:
    performing an eigenvalue decomposition of the low rank dynamical prediction operator to produce eigenvectors;

determining a projection coefficient vector by projecting the data matrix onto the eigenvectors; and determining dominant dynamic modes as the eigenvectors of the low rank dynamical prediction operator that have magnitudes in the projection coefficient vector greater than a threshold; and determining the segments by applying a k-means clustering to the dominant dynamic modes.

6. The method of claim 1, further comprising:

minimizing noise by selecting a regularizer for a distribution of the noise, wherein the regulizer is selected from the group consisting of a Frobenius norm, a Euclidean norm, a sum of absolute values norm, a one-norm regularizer and combinations thereof.

7. The method of claim 1, wherein each frame includes spatial blocks, and further comprising:

stacking horizontal and vertical motion vectors of all the spatial blocks of the set of frames to construct the data matrix.

8. The method of claim 1, wherein the low rank dynamical prediction operator is determined by a dynamic mode decomposition (DMD).

9. The method of claim 1, wherein a motion in each independent pedestrian flow is characterized, further comprising:

extracting a subset of rows of the data matrix;

determining a projection coefficient vector by projecting the subset of rows onto the set of dynamic modes;

determining eigenvalues of the low rank dynamical prediction operator that are associated with entries in the projection coefficient vector with magnitudes bigger than a threshold;

characterizing the independent pedestrian flows according to locations of the eigenvalues in a complex plane.

10. The method of claim 1, wherein the video is in a form of a compressed bitstream.

11. The method of claim 10, wherein the segmenting is at a block level in the bitstream.

12. A system for determining flows, comprising:

a camera configured to acquire a video of the flows, wherein the flows are pedestrians in a scene, wherein the video includes a set of frames; and a processor, connected to the camera, configured to extract motion vectors from each frame in the set, to constructing a data matrix from the motion vectors in the set of frames, to determining a low rank dynamical prediction operator from the data matrix, to analyze a spectrum of the low rank dynamical prediction operator to determine a set of dynamic modes, and to segment the frames into the flows according to a clustering of the dynamic modes, wherein the flows are independent pedestrian flows.

13. The method in claim 1, wherein the low rank dynamical prediction operator is a low rank Koopman operator, and the dynamic modes are Koopman modes.

14. The method in claim 1, wherein the set of dynamic modes includes non-linear and linear dynamics.

15. The method in claim 1, wherein the spectrum of the low rank dynamic prediction operator is used to identify a dynamical regime, such that the dynamical regime characterizes a type of the independent pedestrian flows.

16. The system in claim 12, wherein the low rank dynamical prediction operator is a low rank Koopman operator, and the dynamic modes are Koopman modes.

17. The system of claim 12, wherein the motion vectors include Gaussian distributed noise, and further comprising:

determine the low rank dynamical prediction operator by solving a factorized nuclear norm minimization problem with least squares constraints or total least squares constraints; and minimize the Gaussian distributed noise by a Frobenius norm regulizer.

18. The system of claim 12, further comprising:

perform a singular value decomposition (SVD) of the low rank dynamical prediction operator to produce singular vectors; and apply a k-means clustering or a graph spectral clustering to row space singular vectors of the low rank dynamical prediction operator.

19. The system of claim 12, further comprising:

perform an eigenvalue decomposition of the low rank dynamical prediction operator to produce eigenvectors;

determine a projection coefficient vector by projecting the data matrix onto the eigenvectors; and determine dominant dynamic modes as the eigenvectors of the low rank dynamical prediction operator that have magnitudes in the projection coefficient vector greater than a threshold; and determine the segments by applying a k-means clustering to the dominant dynamic modes.

20. The system of claim 12, further comprising:

minimizing noise by selecting a regularizer for a distribution of the noise, wherein the regulizer is selected from the group consisting of a Frobenius norm, a Euclidean norm, a sum of absolute values norm, a one-norm regularizer and combinations thereof.

* * * * *